United States Patent
Takeda et al.

(10) Patent No.: US 12,022,570 B2
(45) Date of Patent: Jun. 25, 2024

(54) BASE STATION APPARATUS AND USER EQUIPMENT

(71) Applicant: NTT DOCOMO, INC., Tokyo (JP)

(72) Inventors: Daiki Takeda, Tokyo (JP); Kazuaki Takeda, Tokyo (JP); Hiroki Harada, Tokyo (JP); Takayuki Isogawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 332 days.

(21) Appl. No.: 17/441,563

(22) PCT Filed: Mar. 28, 2019

(86) PCT No.: PCT/JP2019/013910
§ 371 (c)(1),
(2) Date: Sep. 21, 2021

(87) PCT Pub. No.: WO2020/194761
PCT Pub. Date: Oct. 1, 2020

(65) Prior Publication Data
US 2022/0182815 A1    Jun. 9, 2022

(51) Int. Cl.
*H04W 8/24*    (2009.01)
*H04W 68/02*    (2009.01)

(52) U.S. Cl.
CPC ............. *H04W 8/24* (2013.01); *H04W 68/02* (2013.01)

(58) Field of Classification Search
CPC ................................ H04W 8/24; H04W 68/02
USPC ........................................................ 455/458
See application file for complete search history.

(56) References Cited

U.S. PATENT DOCUMENTS

| 2017/0142560 | A1  | 5/2017  | Ryu |
| 2019/0200296 | A1* | 6/2019  | Liu ................... H04W 52/0229 |
| 2021/0160814 | A1  | 5/2021  | Wang |
| 2021/0345245 | A1* | 11/2021 | Li .................... H04W 52/0229 |

FOREIGN PATENT DOCUMENTS

| WO | 2018144873 A1 | 8/2018 |
| WO | 2018201499 A1 | 11/2018 |

OTHER PUBLICATIONS

Office Action issued in counterpart Chinese Patent Application No. 201980094254.5 dated Jun. 7, 2023 (19 pages).
Office Action issued in counterpart Japanese Patent Application No. 2021-508678 dated Jul. 4, 2023 (7 pages).
Office Action issued in counterpart Japanese Patent Application No. 2021-508678 dated Feb. 28, 2023 (6 pages).

(Continued)

*Primary Examiner* — Joel Ajayi
(74) *Attorney, Agent, or Firm* — Osha Bergman Watanabe & Burton LLP

(57) ABSTRACT

A base station apparatus including: a transmission unit that transmits a first activation signal, which is an activation signal that becomes a trigger for monitoring a paging occasion, for each group of grouped user equipments and transmits a second activation signal, which is a activation signal common to multiple groups, wherein the transmission unit transmits, to the user equipment, information instructing whether to perform monitoring of the second activation signal or information indirectly instructing whether to perform monitoring of the second activation signal.

5 Claims, 16 Drawing Sheets

(56) References Cited

OTHER PUBLICATIONS

3GPP TSG RAN WG1 Meeting #96; R1-1901502 "UE-group wake-up signal" Huawei, HiSilicon; Athens, Greece; Feb. 25-Mar. 1, 2019 (10 pages).
3GPP TSG RAN WG1 Meeting #95; R1-1813294 "Discussion on UE-group wake up signal in NB-IoT" NTT DOCOMO, Inc.; Spokane, USA; Nov. 12-16, 2018 (4 pages).
3GPP TSG RAN WG1 Meeting #94; R1-1809483 "UE-group wake-up signal for NB-IoT" Sony; Gothenburg, Sweden; Aug. 20-24, 2018 (3 pages).
3GPP TSG RAN WG1 Meeting #94; R1-1809031 "Discussion on UE-group wake-up signal for NB-IoT" Qualcomm Incorporated; Gothenburg, Sweden; Aug. 20-24, 2018 (4 pages).
3GPP TS 36.211 V15.4.0 "3rd Generation Partnership Project; Technical Specification Group Radio Access Network; Evolved Universal Terrestrial Radio Access (E-UTRA); Physical channels and modulation (Release 15)" Dec. 2018 (240 pages).
International Search Report issued in International Application No. PCT/JP2019/013910, dated Jun. 11, 2019 (10 pages).
Written Opinion issued in International Application No. PCT/JP2019/013910; dated Jun. 11, 2019 (7 pages).
Extended European Search Report issued in European Application No. 19921767.0, dated Oct. 20, 2022 (10 pages).

* cited by examiner (a)

(b)

| WUS ID | UE Group ID |
|--------|-------------|
| 1 | UE group ID #1 |
| 2 | UE group ID #2 |
| 3 | UE group ID #3 |
| 4 | UE group ID #4 |

(a)

(b)

| WUS ID | UE Group ID |
|---|---|
| 1 | UE group ID #1 |
| 2 | UE group ID #2 |
| 3 | UE group ID #3 |
| 4 | UE group ID #4 |
| ... | ... |
| 8 | Group common (= UE group #1-#7) |

BASE STATION APPARATUS AND USER EQUIPMENT

TECHNICAL FIELD

The present invention relates to a base station apparatus and a user equipment in a wireless communication system.

BACKGROUND ART

In 3GPP (3rd Generation Partnership Project), a wireless communication system referred to as NR (New Radio) or 5G have been studied to achieve higher capacity system, higher data transmission speed, lower delay in radio sections, and the like.

In addition, in 3GPP, extension of the technology for IoT is being studied based on LTE. For example, for the purpose of power saving of IoT-UE (NB-IoT/eMTC), WUS (Wake-up signal, may be referred to as activation signal) is introduced in LTE-IoT of Rel. 15 (e.g., Non-Patent Document 1).

PRIOR ART DOCUMENTS

Non-Patent Documents

[Non-Patent Document 1] 3GPP TS 36.211 V15.4.0 (2018-12)

SUMMARY OF INVENTION

Problem to be Solved by the Invention

In Rel. 16, introduction of a WUS, which applies to individual groups of UEs, and a WUS, which commonly applies to multiple groups is being studied. However, if the UE monitors both the WUS applied to individual groups and the WUS commonly applied to multiple groups, the power saving effect may be reduced. That is, it may not be appropriate for the UE to monitor both activation signals.

The present invention has been made in view of at least the foregoing points, and is intended to provide a technique for enabling a user equipment to appropriately monitor an activation signal in a wireless communication network in which an activation signal applied to individual groups and an activation signal commonly applied to multiple groups are transmitted.

Means for Solving Problems

According to the disclosed technique, there is provided a base station apparatus including:
a transmission unit that transmits a first activation signal, which is an activation signal that becomes a trigger for monitoring a paging occasion, for each group of grouped user equipments and transmits a second activation signal, which is an activation signal common to multiple groups,
wherein the transmission unit transmits, to the user equipment, information instructing whether to perform monitoring of the second activation signal or information indirectly instructing whether to perform monitoring of the second activation signal.

Effects of the Invention

According to the disclosed technique, in a wireless communication network in which the activation signal applied to individual groups and the activation signal commonly applied to multiple groups are transmitted, a technique is provided that allows the user equipment to monitor the activation signal appropriately.

MODE FOR CARRYING OUT THE INVENTION

Hereinafter, embodiments of the present invention will be described with reference to the drawings. The embodiments described below are examples, and the embodiments to which the present invention is applied are not limited to the following embodiments.

Also, while terms used herein are for existing NR or LTE specifications such as PDCCH, RRC, etc., those represented by channel names, protocol names, signal names, function names, etc. used herein may be referred to as different names.

The following description mainly discusses LTE Rel. 15 and LTE Rel. 16, but the present invention is not limited to LTE but is applicable to other wireless systems including NR.

(System Configuration)

Figure 1:
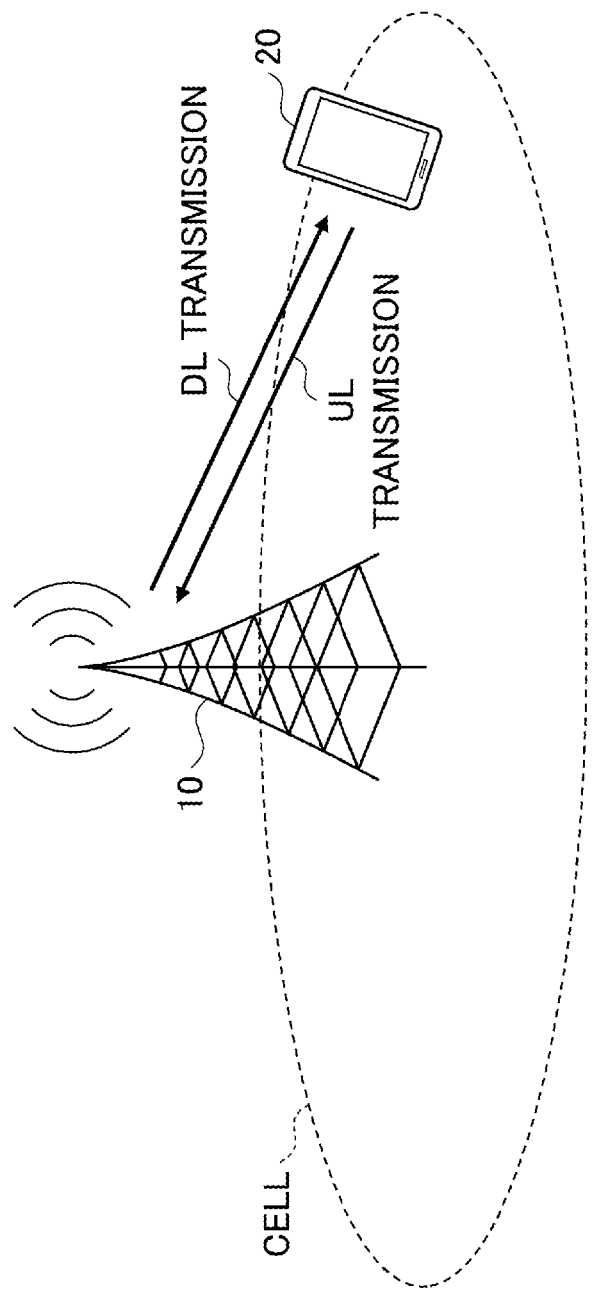
FIG. 1 is a diagram for explaining a wireless communication system according to an embodiment of the present invention.

FIG. 1 is a diagram illustrating a wireless communication system according to an embodiment of the present invention. A wireless communication system in an embodiment of the present invention includes a base station apparatus 10 and a user equipment 20, as shown in FIG. 1. In FIG. 1, one base station apparatus 10 and one user equipment 20 are shown, but this is an example and a plurality of base station apparatuses 10 and a plurality of user equipments 20 may be provided.

The base station apparatus 10 is a communication apparatus that provides one or more cells and performs wireless communication with the user equipment 20. The physical resources of the radio signal are defined in the time domain and the frequency domain, the time domain may be defined in OFDM symbols, and the frequency domain may be defined in subcarriers or resource blocks. The TTI (Transmission Time Interval) in the time domain may be a slot, or the TTI may be a subframe.

The base station apparatus 10 transmits synchronization signals and system information to the user equipment 20. The synchronization signals are, for example, PSS and SSS. System information is transmitted, for example, by a PBCH or a PDSCH, and is also called broadcast information. As shown in FIG. 1, the base station apparatus 10 transmits a control signal or data in DL (Downlink) to the user equipment 20 and receives a control signal or data in UL (Uplink) from the user equipment 20. Here, what is transmitted by a control channel such as PUCCH and PDCCH is called a control signal, and what is transmitted by a shared channel such as PUSCH and PDSCH is called data. This is an example.

The user equipment 20 is a communication device having a wireless communication function such as a smartphone, a cellular phone, a tablet, a wearable terminal, a communication module for M2M (Machine-to-Machine), or the like. As shown in FIG. 1, the user equipment 20 utilizes various communication services provided by the wireless communication system by receiving control signals or data in DL from the base station apparatus 10 and transmitting control signals or data in UL to the base station apparatus 10. The user equipment 20 may be referred to as a UE, and the base station apparatus 10 may be referred to as an eNB (or gNB).

As described above, the user equipment 20 can be a variety of terminals, but it is assumed that the user equipment 20 according to this embodiment is primarily an IoT-UE of the LTE Rel. 16 (or a Rel. 16 or later release). However, the user equipment 20 is not limited to the IoT-UE of the LTE Rel. 16 (or Rel. 16 or later release). The assumed IoT-UE may also be an NB-IoT UE or an eMTC UE.

(About WUS)

In the wireless communication system according to the present embodiment, the base station apparatus 10 transmits a WUS, and the user equipment 20 monitors the WUS. First, the WUS will be described.

Before the WUS is introduced, an Idle state user equipment 20 monitors periodically arriving POs (Paging Occasion, paging occasion) each time. It should be noted that monitoring a PO may be replaced with monitoring a paging PDCCH or monitoring a paging search space.

On the PO monitoring, the user equipment 20 demodulates a DCI transmitted by the PDCCH and checks if it is a DCI addressed to the user equipment. Therefore, regardless of whether a DCI addressed the user equipment 20 is transmitted or not, the user equipment 20 is required to perform demodulation operation for each PO, and is likely to result in wasted power consumption. In particular, if the paging PDCCH is transmitted repeatedly, the DCI must also be demodulated repeatedly, and there is a high likelihood of wasted power consumption.

Therefore, WUS was introduced in Rel. 15_LTE-IoT. The WUS in Rel. 15_LTE-IoT (WUS specified in the specification of LTE Rel. 15) is associated with PO in a one-to-one manner. The resource by which the WUS is transmitted is, for example, calculated from a UE-ID (e.g., IMSI). Further, it is notified that paging to the user equipment 20 is present in one bit in the WUS. The sequence of WUS is calculated from a cell ID, time position of PO, etc. as described in Non-Patent Document 1 (10.2.6B.1).

The user equipment 20 monitors the WUS with the resources of the WUS, knows that paging to the user equipment 20 may be present when the WUS (a sequence specified by a WUS parameter notified by the system information, and the like) is detected by the user equipment 20, and monitors the paging PDCCH at the PO. That is, the WUS is an activation signal that triggers monitoring of a paging occasion.

Figure 2:
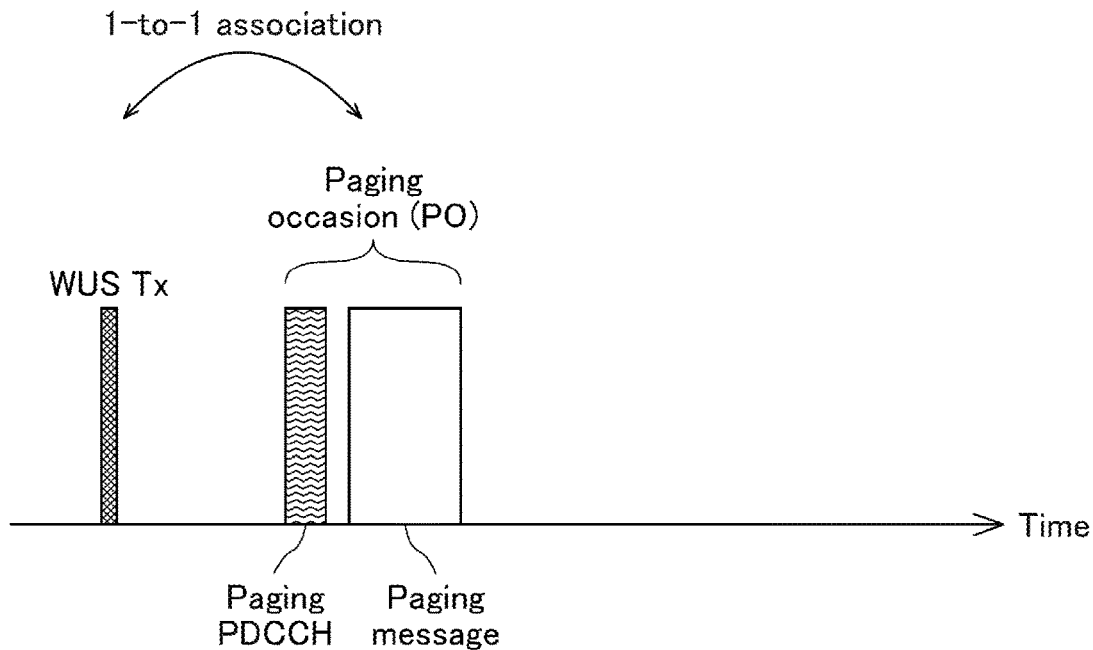
FIG. 2 is a diagram for explaining a WUS of Rel. 15.

An operation example related to WUS of Rel. 15_LTE-IoT will be described with reference to FIGS. 2 and 3. FIG. 2 illustrates an example in which no repeated transmission of paging PDCH is performed. As shown in FIG. 2, when the user equipment 20 detects a WUS, the user equipment 20 monitors the paging PDCCH and reads a paging message when a DCI for the user equipment 20 is received.

Figure 3:
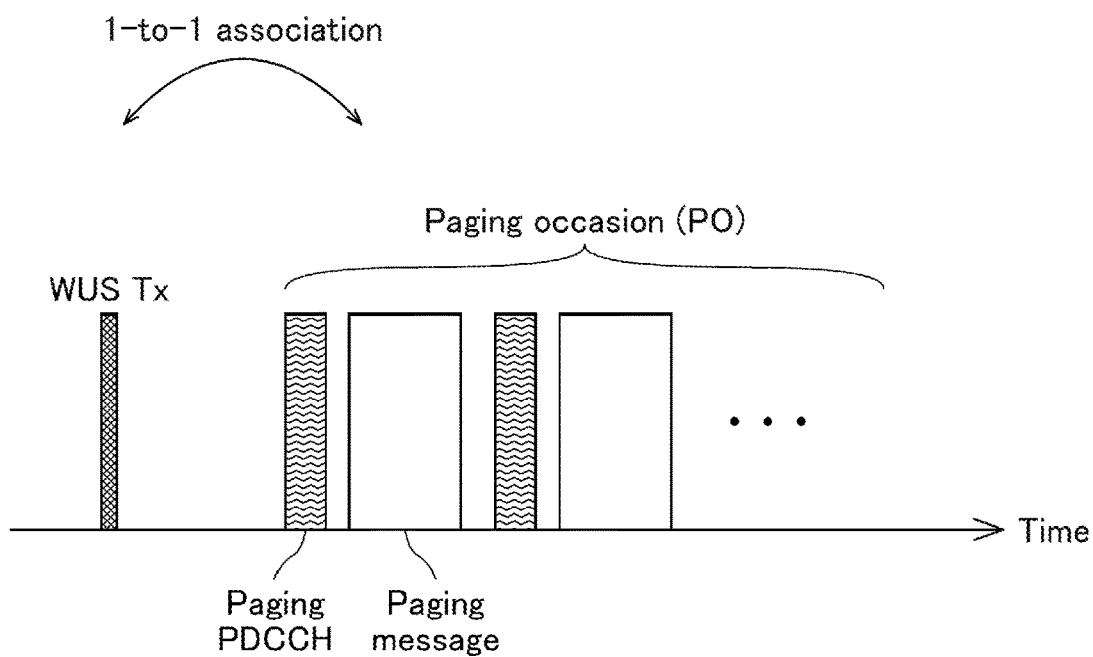
FIG. 3 is a diagram for explaining a WUS of Rel. 15.

FIG. 3 shows an example in a case where repeated transmission of paging PDCCH is performed. If the user equipment 20 detects a WUS, the user equipment 20 repeatedly monitors the paging PDCCH.

The WUS in Rel. 15 is associated with PO on a one-to-one basis. On the other hand, PO is common to multiple user equipments. Therefore, all of the user equipments in the Idle state that detects the WUS are activated to monitor the paging PDCCH. That is, many user equipments that are not destinations for paging may be activated.

Therefore, in the present embodiment related to LTE Rel. 16, grouping of user equipments is performed based on UE-ID or the like. That is, basically, a user equipment belonging to a group monitors only a WUS of that group. This can reduce the number of user equipments that are activated despite not being destination of the paging.

The group is identified by a UE group ID. User equipments that support Rel. 16_WUS also support Rel. 15 WUS.

Hereinafter, WUS in Rel. 16 is described as Rel. 16_WUS, and WUS in Rel. 15 is described as Legacy WUS. If these are not specifically distinguished, the term "WUS" is used. Legacy WUS may also be referred to as legacy activation signal.

The UE group ID is used to generate a sequence of Rel. 16_WUS. The number of UE groups can be configured from the base station apparatus 10 to the user equipment 20, and for example, broadcast from the base station apparatus 10 by a SIB.

For example, multiplexing of Rel. 16_WUS and legacy WUS can be performed in one of the following ways: TDM, FDM, single sequence CDM, single sequence CDM+TDM, single sequence CDM+FDM.

Multiplexing between multiple WUSes can also be performed, for example, in one of the following ways: single sequence CDM, FDM, single sequence CDM+TDM, single sequence CDM+FDM.

The single sequence CDM is, for example, a method in which a plurality of WUS sequences are generated by multiplying a base WUS sequence by an orthogonal sign, that is, a sign with zero or low cross-correlation, and one of the generated WUS sequences is selected and transmitted.

(WUS Resource Allocation)

According to the present embodiment, a method of allocating a WUS resource (a time and frequency resource) that is a resource (a resource that the user equipment 20 monitors for WUS) used by the base station apparatus 10 when transmitting WUS to the user equipment 20 will be described.

In this embodiment, up to two WUS resources are configured for each domain of the time domain and frequency domain. The term "configure" herein may mean that each WUS resource is configured from the base station apparatus 10 to the user equipment 20, or that the base station apparatus 10 determines each WUS resource. In the latter case, the user equipment 20 knows only WUS resources by which the user equipment 20 monitors a WUS in the manner described below.

In addition, multiple WUSes are multiplexed by using CDM (e.g., single sequence CDM) within a single WUS resource.

Figure 4:
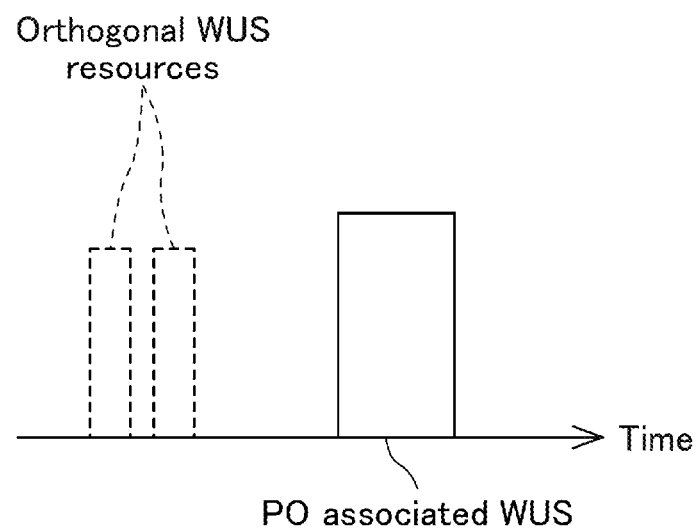
FIG. 4 is a diagram showing an example of WUS resource allocation.
Figure 5:
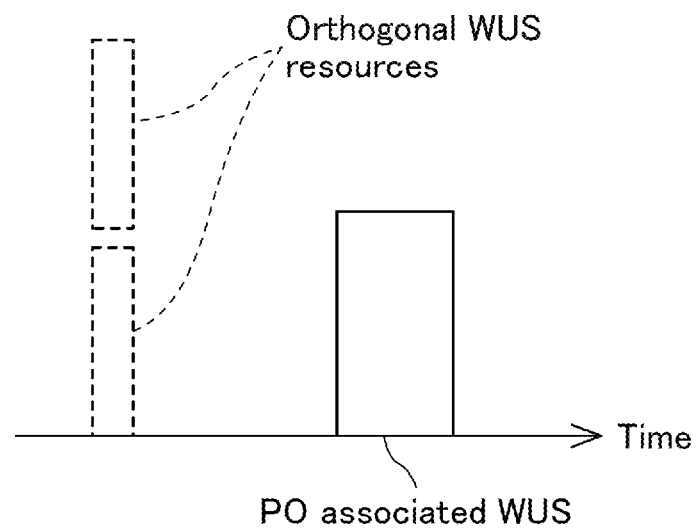
FIG. 5 is a diagram showing an example of WUS resource allocation.
Figure 6:
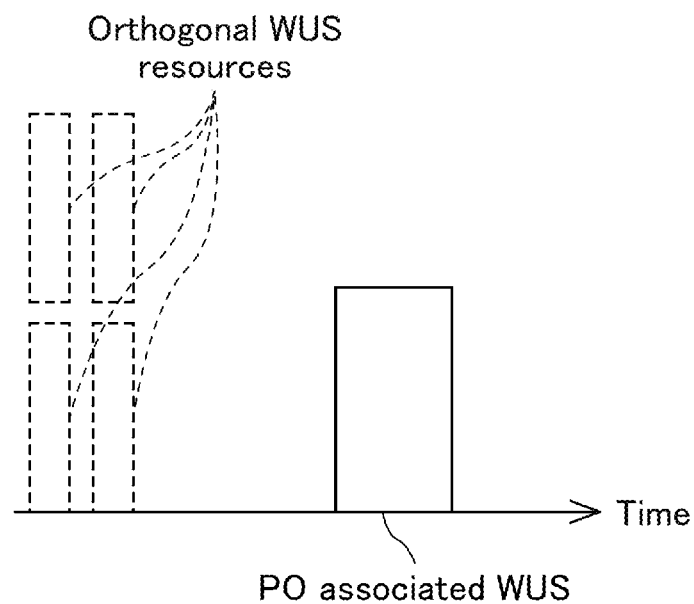
FIG. 6 is a diagram showing an example of WUS resource allocation.

FIGS. 4-6 illustrate an example where multiple orthogonal WUS resources are configured. In each figure, the vertical axis is frequency and the horizontal axis is time. "Orthogonal" means that the resources are not overlapped.

FIG. 4 shows an example in which two WUS resources are configured in time direction. FIG. 5 shows an example where two WUS resources are configured in the frequency direction. FIG. 6 shows an example where four WUS resources are configured.

FIGS. 7 to 12 illustrate an example in which Rel. 16_WUS or legacy WUS is transmitted from the base station apparatus 10 by the WUS resource described above. FIGS. 7 to 12 respectively show the case in which a legacy WUS is included, but the legacy WUS may not be present.

Figure 7:
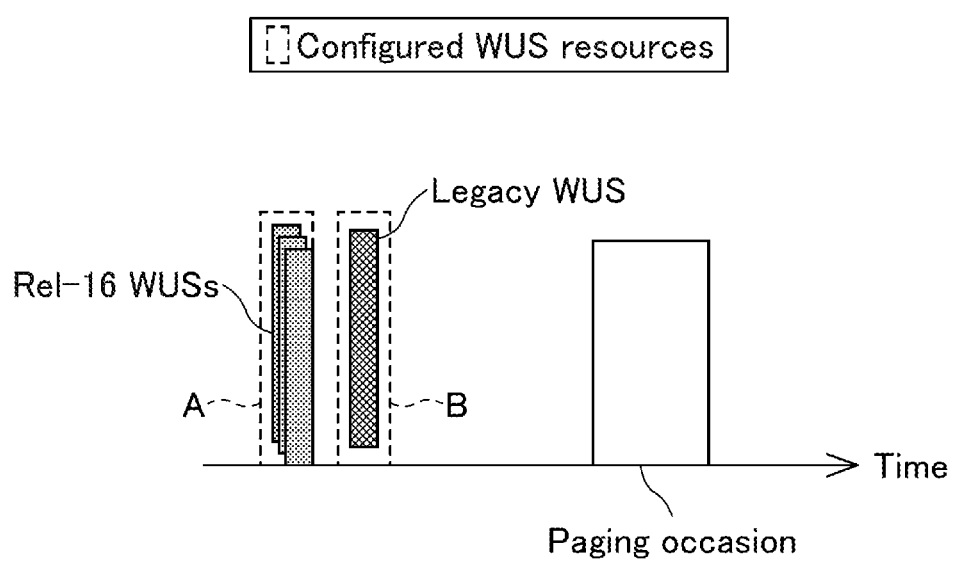
FIG. 7 is a diagram showing an example of WUS resource allocation.

FIG. 7 shows an example in which a WUS resource A and a WUS resource B are arranged in a time direction. As shown in FIG. 7, a plurality of Rel. 16_WUSes multiplexed by CDM are transmitted by the WUS resource A, and a legacy WUS is transmitted by the WUS resource B.

Figure 8:
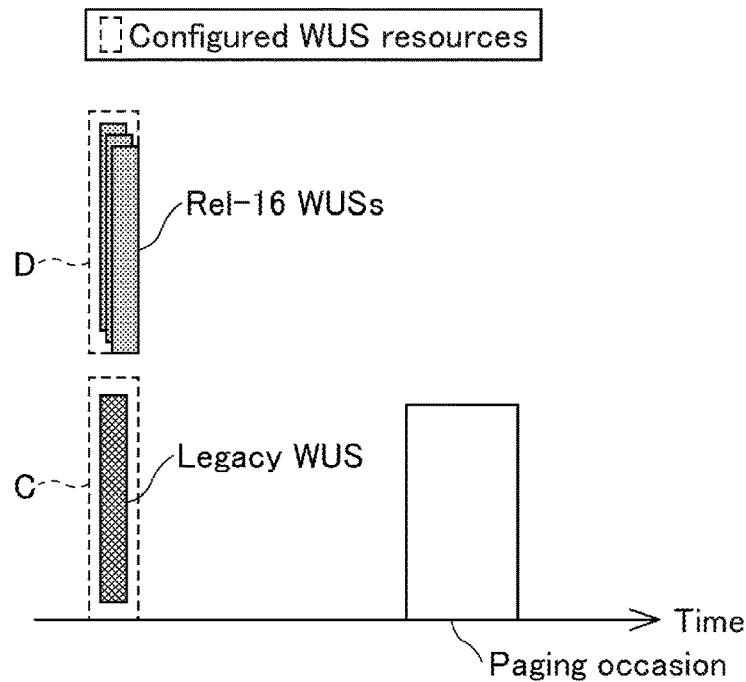
FIG. 8 is a diagram showing an example of WUS resource allocation.

FIG. 8 shows an example where a WUS resource C and a WUS resource D are arranged in the frequency direction. As shown in FIG. 8, a legacy WUS is transmitted by the WUS resource C, and multiple Rel. 16_WUSes multiplexed with CDM is transmitted by the WUS resource D.

Figure 9:
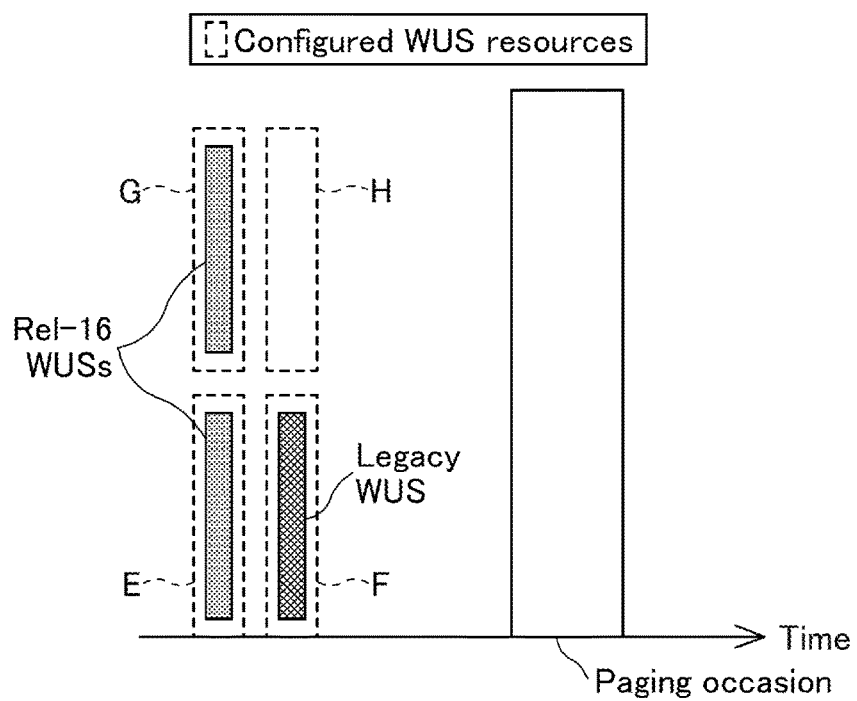
FIG. 9 is a diagram showing an example of WUS resource allocation.

FIG. 9 shows an example in which a WUS resource E, a WUS resource F, a WUS resource G, and a WUS resource H are arranged in the time direction and the frequency direction. As shown in FIG. 9, a Rel. 16_WUS is transmitted by WUS resources E and G, respectively, and a legacy WUS is transmitted by the WUS resource F.

Figure 10:
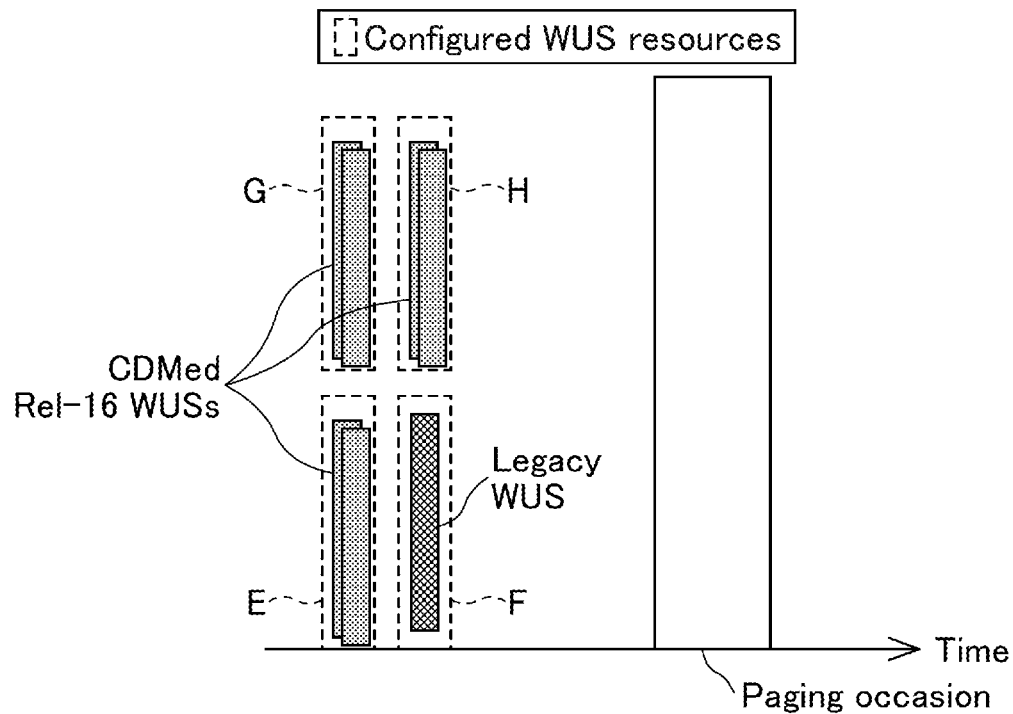
FIG. 10 is a diagram showing an example of WUS resource allocation.

FIG. 10 shows another example in which the WUS resource E, the WUS resource F, the WUS resource G, and the WUS resource H are arranged in a time direction and a frequency direction. As shown in FIG. 10, a plurality of Rel. 16_WUSes CDM multiplexed on each of WUS resources E, G, and H is transmitted, and a legacy WUS is transmitted on the WUS resource F.

Figure 11:
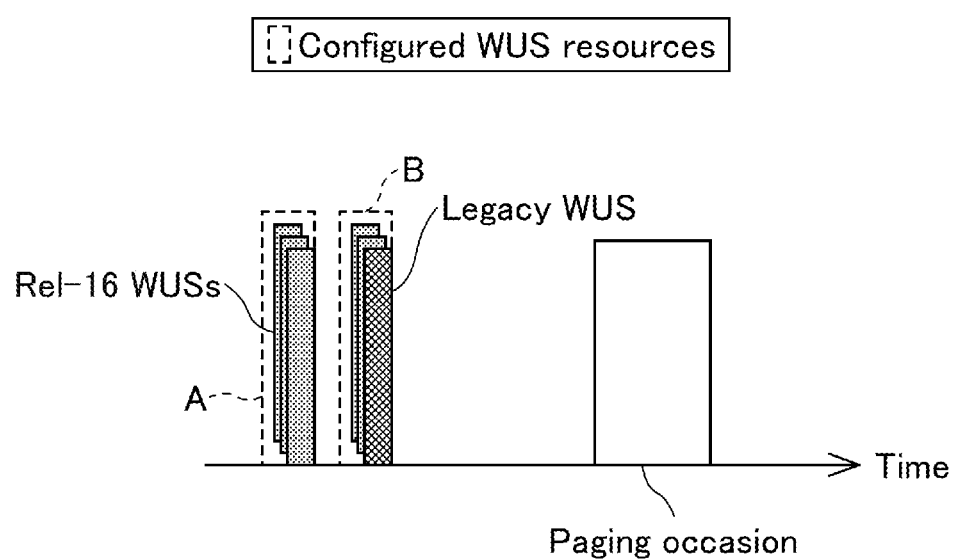
FIG. 11 is a diagram showing an example of WUS resource allocation.

FIG. 11 shows another example in which a WUS resource A and a WUS resource B are arranged in a time direction. As shown in FIG. 11, the CDM multiplexed plurality of Rel. 16_WUSes are transmitted by the WUS resource A, and the CDM multiplexed plurality of Rel. 16_WUSes and the legacy WUS are transmitted by the WUS resource B.

Figure 12:
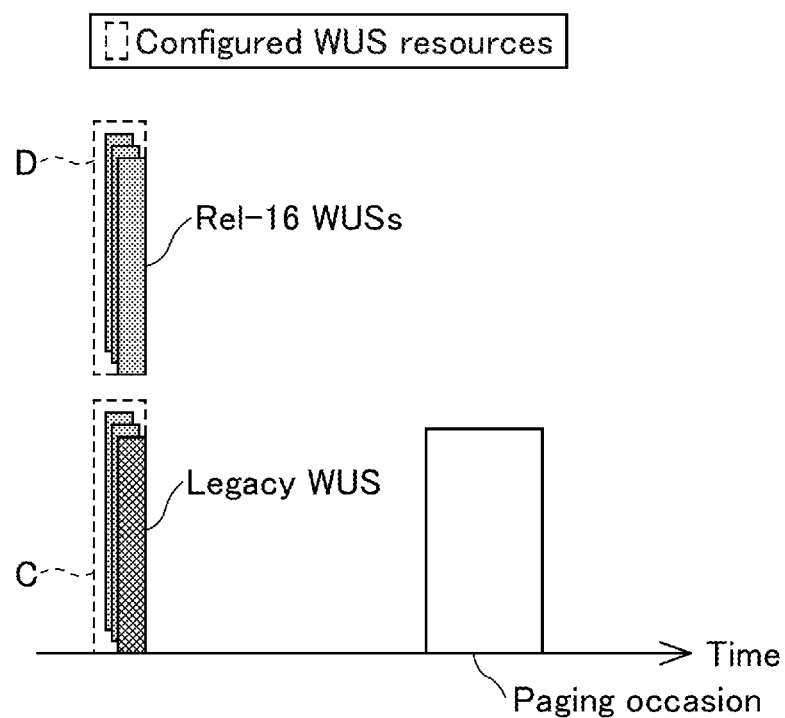
FIG. 12 is a diagram showing an example of WUS resource allocation.

FIG. 12 shows another example in which a WUS resource C and a WUS resource D are arranged in the frequency direction. As shown in FIG. 12, a plurality of Rel. 16_WUSes and a legacy WUS multiplexed with CDM at the WUS resource C are transmitted, and a plurality of Rel. 16_WUSes multiplexed with CDM at the WUS resource D are transmitted.

Example of WUS Detection Procedure

For power saving, in this embodiment, in principle, the user equipment 20 monitors a WUS (one or more WUSes) with only one WUS resource. For example, as illustrated in FIG. 10 and the like, even when a WUS can be transmitted from the base station apparatus 10 by a plurality of WUS resources, the user equipment 20 monitors only one WUS resource corresponding to its own UE group ID among the plurality of WUS resources.

Figure 13:
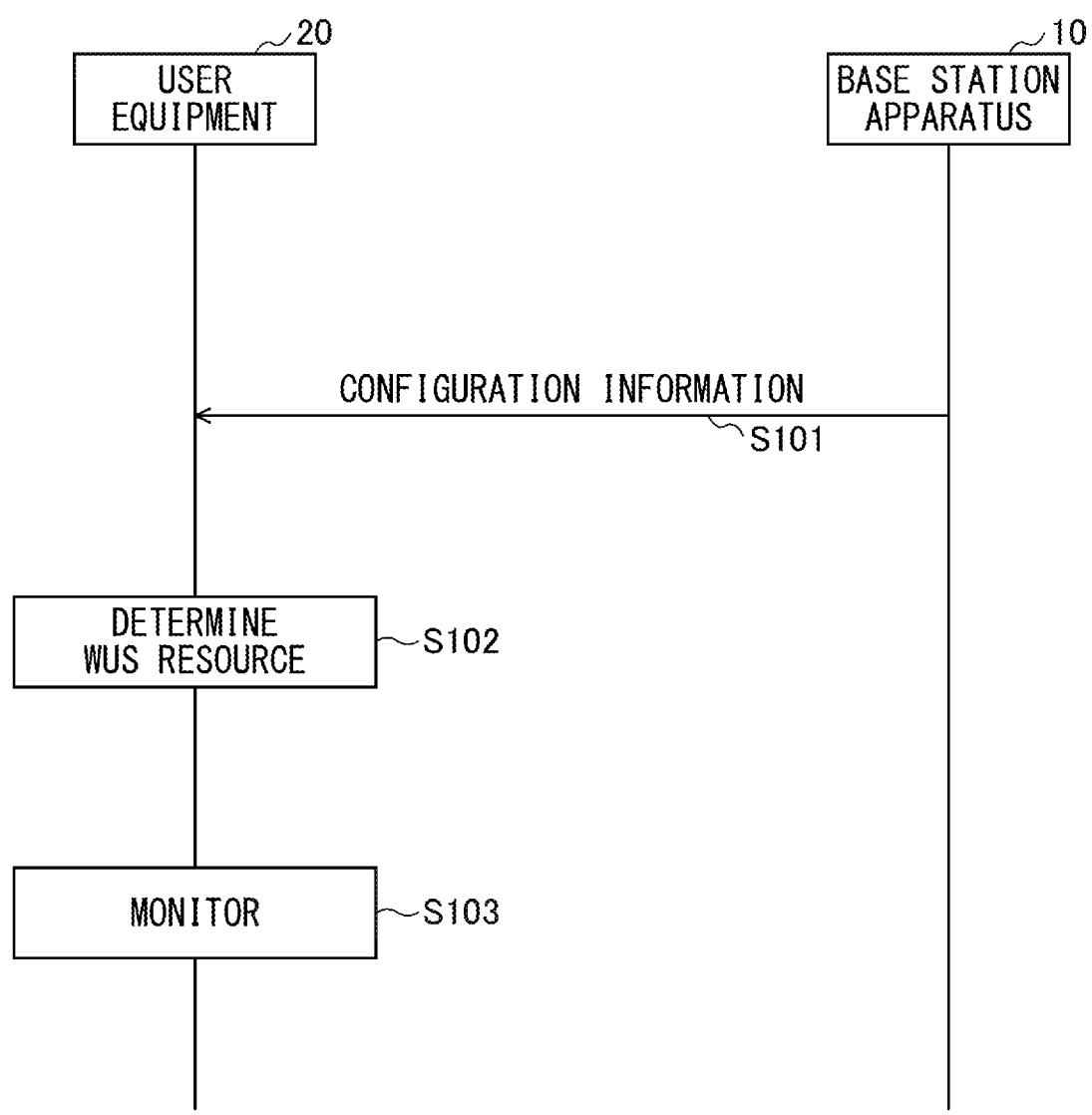
FIG. 13 is a diagram illustrating a sequence example for WUS monitoring of a user equipment 20.

FIG. 13 shows an example of a processing sequence when the user equipment 20 monitors a WUS resource.

In S101, the base station apparatus 10 transmits configuration information, and the user equipment 20 receives configuration information. The configuration information includes a UE group ID to be configured in the user equipment 20. The configuration information may include gap information (time) between the WUS and the PO. In addition, as will be described later, the configuration information may include the number of UE groups, and information indicating whether to monitor a WUS common to multiple groups.

The configuration information may be transmitted by RRC signaling, MAC CE, DCI, or other methods.

In S102, the user equipment 20 determines a time and frequency position of a WUS resource to be monitored based on the UE group ID configured in S101. For example, if a size of one WUS resource (frequency direction length and time direction length) is predetermined and an equation for calculating the time and frequency position of the WUS resource from the UE group ID is predetermined, the user equipment 20 can calculate the time and frequency position of the WUS resource from the UE group ID and the equation, and determine to monitor the WUS resource of the predetermined size at that position.

For example, when time and frequency positions of WUS resources corresponding to each of the plurality of UE group IDs are predetermined by a table or the like (when the user equipment 20 holds the table), the user equipment 20 can determine the time and frequency position of the WUS resource corresponding to its own UE group ID from the table.

In step S103, the user equipment 20 monitors a WUS with the WUS resource determined in step S102. The sequence of WUS is also associated with the UE group ID. In the WUS monitoring, the user equipment 20 searches for the sequence of WUS corresponding to its UE group ID.

(About Group Common WUS)

In this embodiment, as Rel. 16_WUS, in addition to the WUS for each group, a group common WUS (Group common WUS) that can activate all the user equipments in the cell supporting WUS, and a multiple group WUS (Multiple Group WUS) that can activate multiple, but not all, groups of user equipments can be used.

The group common WUS capable of activating all user equipments and a multiple group WUS capable of activating a plurality of user equipments may be collectively referred to as a "WUS common to multiple groups."

When the group common WUS/multiple group WUS is used, the user equipment 20 needs to monitor the group common WUS/multiple group WUS in addition to monitoring the group specific Rel. 16_WUS corresponding to a group to which the user equipment 20 belongs. "Group Common WUS/Multiple Group WUS" means Group Common WUS or Multiple Group WUS, or Group Common WUS and Multiple Group WUS.

Figure 14:
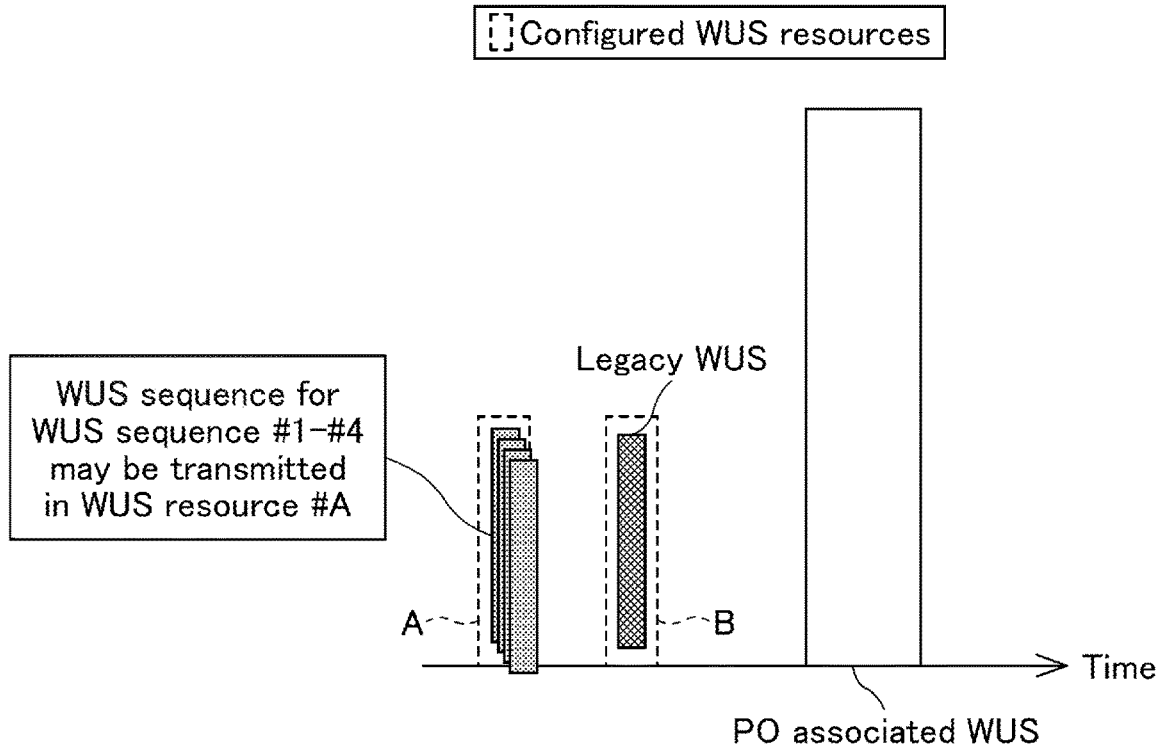
FIG. 14 is a diagram for explaining a problem.

For example, it is assumed that, as shown in FIG. 14(b), correspondence between WUS ID (WUS sequence ID) and UE group ID is set, and that as shown in FIG. 14(a), WUS #1 through #4 are transmitted by the WUS resource A and the legacy WUS is transmitted by the WUS resource B. As shown in FIG. 14(b), WUS #4 is a group common WUS, and WUS #1 through #3 are group specific WUSes.

For example, when the user equipment 20 in the idle state belongs to the group of the UE group ID #1, the user equipment 20 monitors the WUS #1 corresponding to the UE group ID #1 with the WUS resource A corresponding to the UE group ID #1 and monitors the WUS #4 common to the group by the WUS resource A. If the user equipment 20 detects WUS #1 or WUS #4, the user equipment 20 wakes up and monitors a corresponding PO.

However, monitoring the group common WUS in addition to the group-specific WUS may reduce the power saving effect. In particular, when the traffic load is low, the power saving effect is likely to be reduced.

Example 1: Enabling/Disabling Group Common WUS/Multiple Group WUS

A technique for solving the problem that monitoring the group common WUS/multiple group WUS in addition to the group specific WUS may result in a decrease in the power saving effect will be described as Example 1.

Example 1 enables the user equipment 20 to disable or enable monitoring of the group common WUS/multiple group WUS by system information (e.g., SIB1-BR, other system information) or by upper layer signaling (e.g., RRC signaling, MAC CE, etc.). SIB1 stands for System Information Block Type 1 and BR stands for Bandwidth-Reduced.

Figure 15:
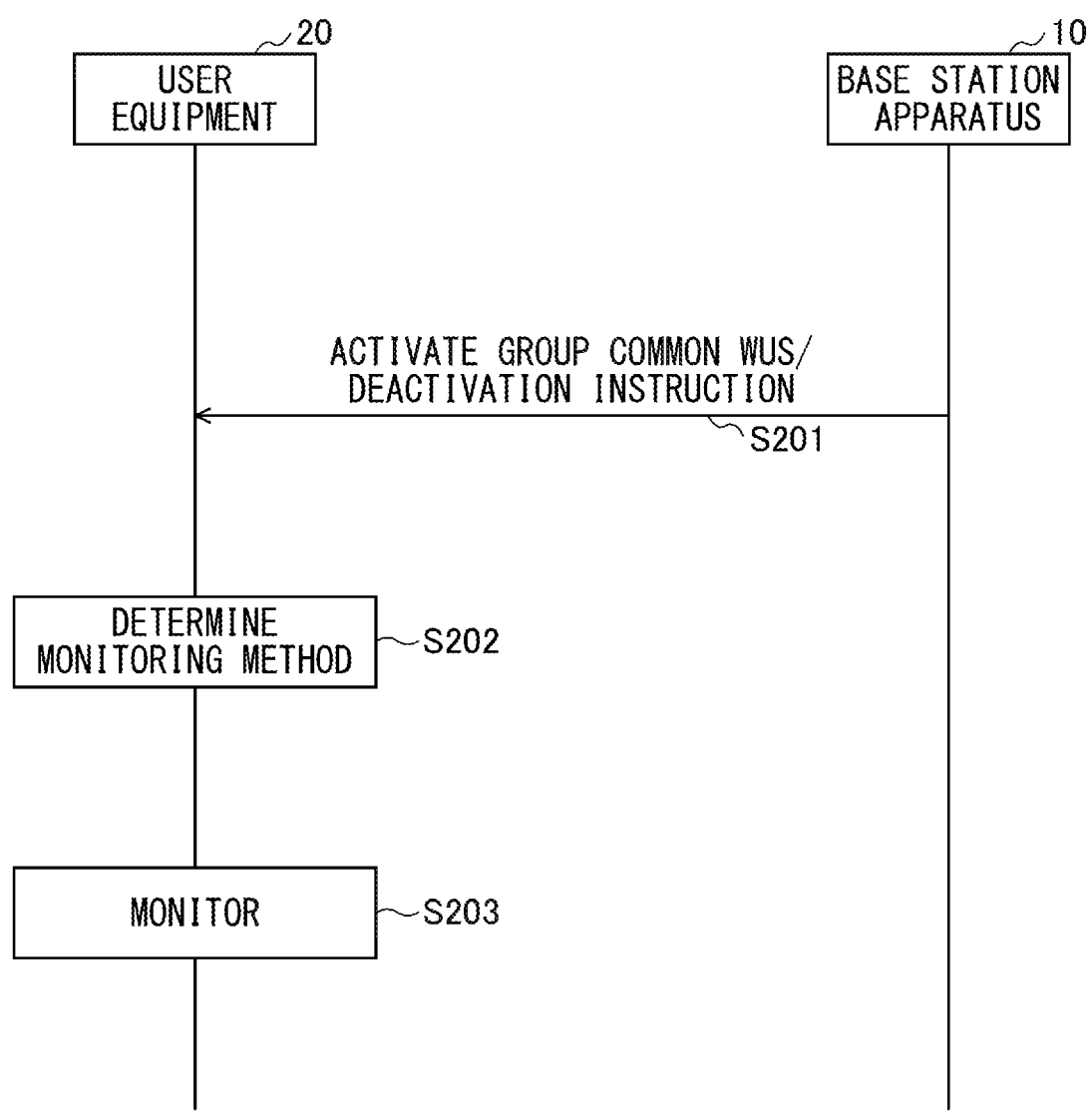
FIG. 15 is a diagram illustrating a sequence example of a group common WUS activation/deactivation instruction.

An operation example of the Example 1 will be described with reference to FIG. 15. FIG. 15 shows an example of control for the group common WUS. In S201, the base station apparatus 10 instructs the user equipment 20 to enable or disable the group common WUS through system information or upper layer signaling.

In S202, the user equipment 20 determines a monitoring method of a WUS according to the instruction received at S201. For example, when disabling the group common WUS is instructed, only the group specific WUS is monitored, and it is determined that the group common WUS is not monitored. In S203, the user equipment 20 monitors the WUS in the manner determined in S202.

The configuration in S201 may be performed together with the configuration of S101 in FIG. 13 (configuration of the UE group ID or the like), or may be performed separately from the configuration of S101 in FIG. 13.

Further, in S201, in addition to the above-described instruction for enabling/disabling, information such as the number and position of WUS resources may be transmitted.

Further, as shown in FIG. 15, instead of explicitly instructing enabling/disabling of the group common WUS/multiple group WUS, the user equipment 20 may autonomously determine whether to enable or disable the group common WUS/multiple group WUS.

For example, the number of UE group IDs (the number of UE groups) used in the cell in which the user equipment 20 is located is notified from the base station apparatus 10 to the user equipment 20 by system information or upper layer signaling. The user equipment 20 determines whether to enable or disable the group common WUS/multiple group WUS based on the number of UE group IDs. The "number of UE group IDs" is an example of information that indirectly instructs whether to monitor the group common WUS/multiple group WUS. In this embodiment, an example is shown in which enabling/disabling of the group common WUS/multiple group WUS is determined by the "number of UE group IDs". However, the enabling/disabling of the group common WUS/multiple group WUS may be determined by "information indirectly indicating whether to monitor the group common WUS/multiple group WUS" other than the "number of UE group IDs".

Hereinafter, examples 1 to 3 will be described as an example of a decision based on the "number of UE group IDs."

Example 1: When the number of UE group IDs is small (for example, 4), both group common WUS and multiple group WUS are disabled.

Example 2: When the number of UE group IDs is large (for example, 8), only the group common WUS of the group common WUS and the multiple group WUS is enabled and the multiple group WUS is disabled.

Example 3: When the number of UE group IDs is very large (e.g. 16), both group common WUS and multiple group WUS are enabled.

When the number of UE group IDs is small, the advantage of using the group common WUS or the multiple group WUS is small. Therefore, as shown in Example 1, power saving is prioritized and both the group common WUS and the multiple group WUS are disabled.

On the other hand, when the number of UE group IDs is very large as in Example 3, there is a large advantage in using any of the group common WUS and the multiple group WUS. Thus, in Example 3, both the group common WUS and the multiple group WUS are enabled.

Since Examples 1 to 3 are examples, judgment other than Examples 1 to 3 may be made. In addition, the base station apparatus 10 may make a decision based on the number of UE group IDs as in Examples 1 to 3. The base station apparatus 10 may use the determination result based on the number of the UE group IDs for instruction to the user equipment 20 (instruction in S201).

Figure 16:
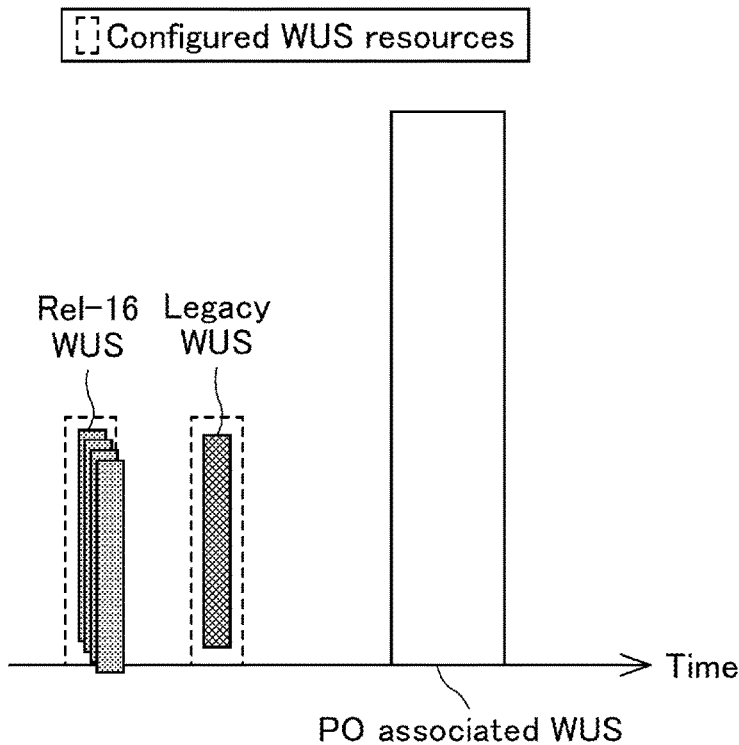
FIG. 16 is a diagram showing an example when the number of UE group IDs is small.
Figure 17:
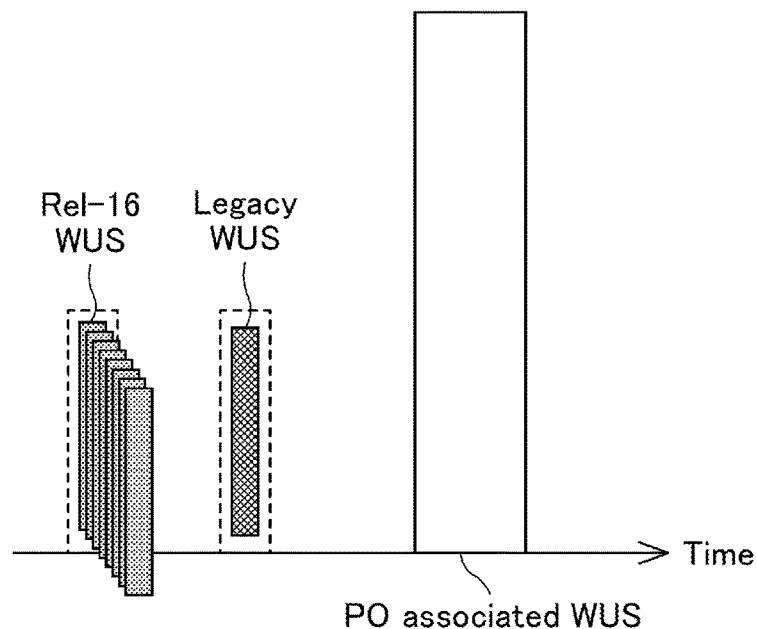
FIG. 17 is a diagram showing an example when the number of UE group IDs is large.

FIG. 16 shows the "case where the number of UE group IDs is small" in Example 1, and FIG. 17 shows the "case where the number of UE group IDs is large" in Example 2.

In the determination of "the number of UE group IDs is small" in Example 1 above, a threshold value may be used to determine that "the number of UE group IDs is small" if the number of UE group IDs is less than or equal to the threshold value. Also in the determination of "the number of UE group IDs is large" in Example 2 above, a threshold value may be used to determine that "the number of UE group IDs is large" if the number of UE group IDs is greater than or equal to the threshold value. Thresholds can also be used for Example 3.

The determination method as described in Examples 1 to 3 may be configured from the base station apparatus 10 to the user equipment 20 by system information or upper layer signaling, or the determination method as described in Examples 1 to 3 may be described in the specification, and the user equipment 20/base station apparatus 10 may operate in accordance with the specification.

In a wireless communication network in which an activation signal applied to individual groups and an activation signal applied commonly to multiple groups are transmitted, the user equipment can appropriately monitor an activation signal.

Example 2

Next, Example 2 will be described. As noted above, even when multiple WUS resources are configured, the user equipment 20 monitors a WUS by only one WUS resource.

Here, for example, when WUS resource A and WUS resource B are used, a case is considered where a user equipment belonging to a UE group ID #1 monitors a WUS of the WUS resource A and a user equipment belonging to a UE group ID #2 monitors a WUS of the WUS resource B.

In this case, when the base station apparatus 10 transmits a group common WUS for the purpose of activating all user equipments in the cell only by the WUS resource A, the user equipment that monitors the WUS resource B does not monitor the group common WUS, and thus cannot detect the group common WUS.

Accordingly, in the present embodiment, when a plurality of WUS resources are configured and Rel. 16_WUS is transmitted by each WUS resource, the base station apparatus 10 may transmit the group common WUS by each WUS resource.

Figure 18:
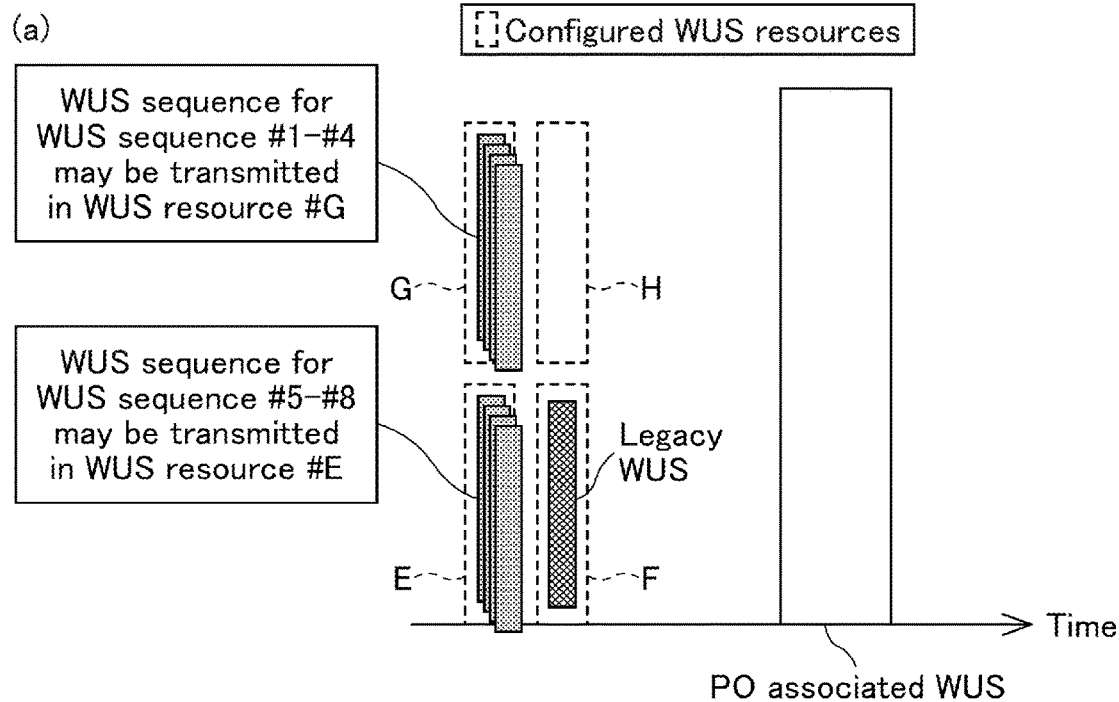
FIG. 18 is a diagram illustrating an example when a group common WUS is arranged in multiple WUS resources.

An example is shown in FIG. 18. In the example of FIG. 18, the Rel. 16 WUSes corresponding to the UE group IDs #1 to #3 are transmitted respectively by the WUS resource G, and the Rel. 16 WUSes corresponding to the UE group IDs #4 to #6 are respectively transmitted by the WUS resource E. Therefore, the group common WUS is transmitted in each of the WUS resource G and WUS resource E.

All user equipments can appropriately monitor the group common WUS by the above method. However, transmitting the group common WUS, which is a signal of the same purpose, using multiple WUS resources is not preferable because it consumes radio resources. It is desirable to minimize the number of group common WUSes that should be transmitted.

Therefore, in the Example 2, a legacy WUS may be used as a group common WUS. In other words, a sequence of the legacy WUS may be used as one of sequences of the group common WUS.

Figure 19:
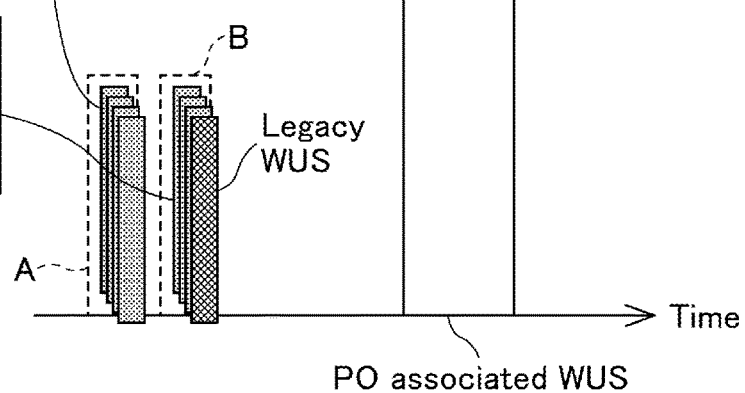
FIG. 19 is a diagram showing an example when a group common WUS is arranged in one WUS resource.

An example is shown in FIG. 19. In the example of FIG. 19, the respective Rel. 16 WUS corresponding to the UE group IDs #1-#3 and the group common WUS are transmitted by the WUS resource A, and the respective Rel. 16 WUS corresponding to the UE group IDs #4-#6 and the legacy WUS are transmitted by the WUS resource B. A user equipment 20 supporting Rel. 16_WUS monitors the legacy WUS as a group common WUS when monitoring the WUS resource B. Therefore, in the WUS resource B, there is no need to transmit the group common WUS, and the legacy WUS can be used as the group common WUS, so that the radio resource can be used effectively.

For example, when the base station apparatus 10 decides to transmit the group common WUS in order to activate all user equipments, the base station apparatus 10 transmits the group common WUS by the WUS resource A and transmits the legacy WUS by the WUS resource B.

When the user equipment 20 belongs to the group of the UE group ID #1, the user equipment 20 monitors a WUS of the WUS_ID #1 transmitted by the WUS resource A and also monitors the group common WUS of the WUS_ID #4 transmitted by the WUS resource A. The user equipment 20 monitors the PO if it detects the group common WUS.

When the user equipment 20 belongs to the group of the UE group ID #4, the user equipment 20 monitors a WUS of the WUS_ID #5 transmitted by the WUS resource B and monitors the legacy WUS of the WUS_ID #8 transmitted by the WUS resource B. The user equipment 20 monitors the PO if it detects the legacy WUS.

The legacy WUS (legacy activation signal) is an example of a third activation signal that is transmitted by a resource other than the one that transmits "group common WUS/multiple group WUS (second activation signal)". Signals other than the legacy WUS may be used as the third activation signal. The third activation signal may be "group common WUS/multiple group WUS."

Also in Example 2, in the wireless communication network in which an activation signal applied to individual groups and an activation signal applied to multiple groups are transmitted, the user equipment can appropriately monitor an activation signal.

(Apparatus Configuration)

Next, a functional configuration example of the base station apparatus 10 and the user apparatus 20 that perform processes and operations described above will be described. The base station apparatus 10 and the user equipment 20 include functions for implementing the above-described Examples 1-2. However, the base station apparatus 10 and the user equipment 20 may each comprise only functions of any one of the embodiments of the Examples 1-2 with respect to Examples 1-2.

(Base Station Apparatus 10)

Figure 20:
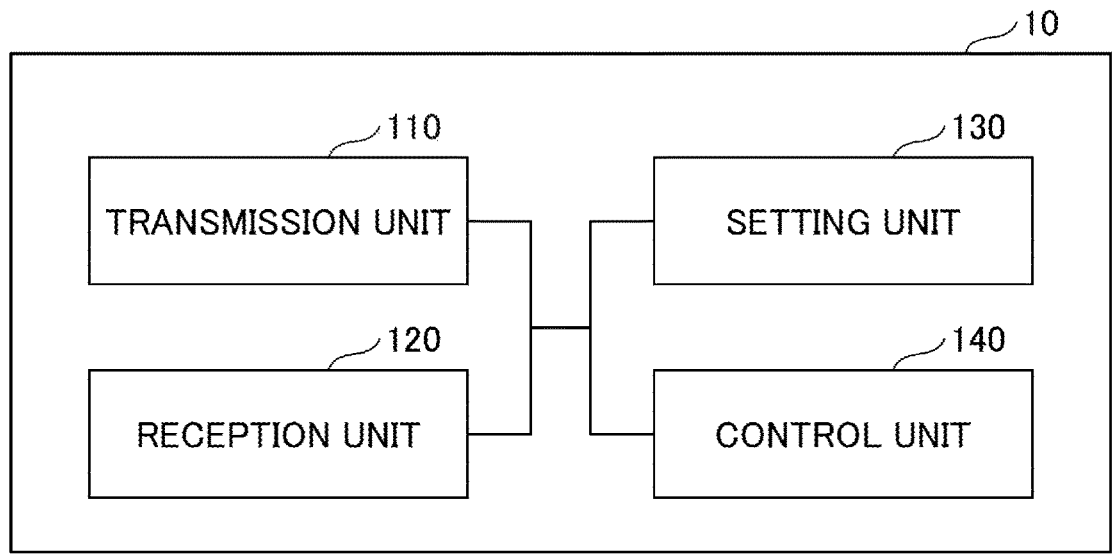
FIG. 20 is a diagram showing an example of a functional configuration of the base station apparatus 10 according to an embodiment of the present invention.

FIG. 20 is a diagram illustrating an example of a functional configuration of the base station apparatus 10. As shown in FIG. 20, the base station apparatus 10 includes a transmission unit 110, a reception unit 120, a setting unit 130, and a control unit 140. The functional configuration shown in FIG. 20 is only one example. As long as the operation according to the embodiments of the present invention can be performed, the functional sections and the name of the functional unit may be any one.

The transmission unit 110 includes a function for generating a signal to be transmitted to the user equipment 20 side and transmitting the signal wirelessly. The receiving unit 120 includes a function for receiving various signals transmitted from the user equipment 20 and acquiring, for example, information of a higher layer from the received signals.

The setting unit 130 stores preconfigured configuration information and various configuration information to be transmitted to the user equipment 20 in the storage device and reads the preconfigured configuration information from the storage device if necessary. The control unit 140 determines whether or not to cause the user equipment to monitor a WUS common to a plurality of user equipments based on, for example, the number of groups of user equipments. A function unit related to signal transmission in the control unit 140 may be included in the transmission unit 110, and a function unit related to signal reception in the control unit 140 may be included in the receiving unit 120.

<User Equipment 20>

Figure 21:
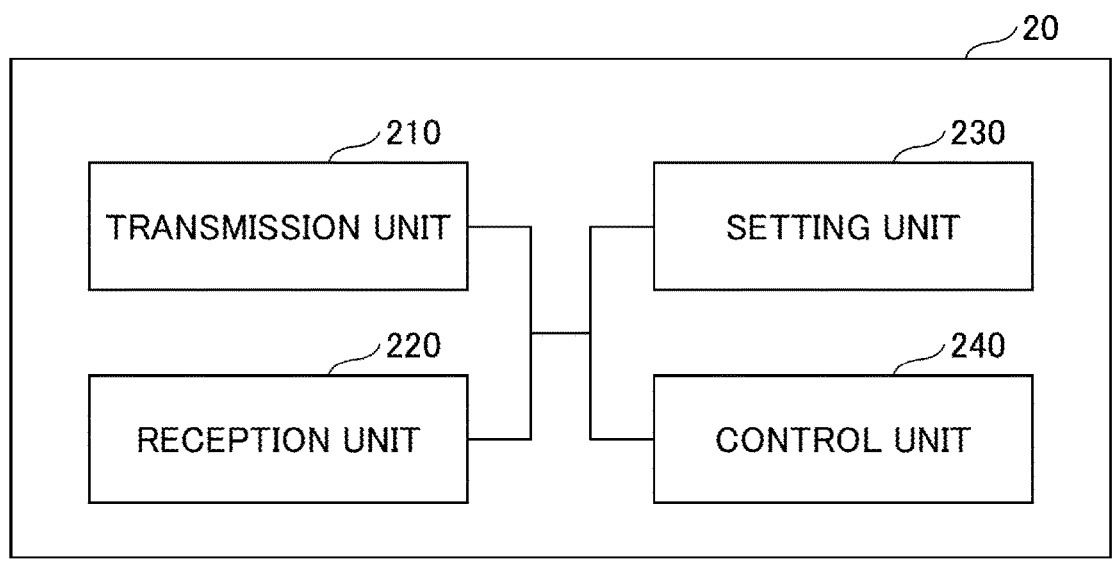
FIG. 21 is a diagram showing an example of a functional configuration of a user equipment 20 according to an embodiment of the present invention.
Figure 22:
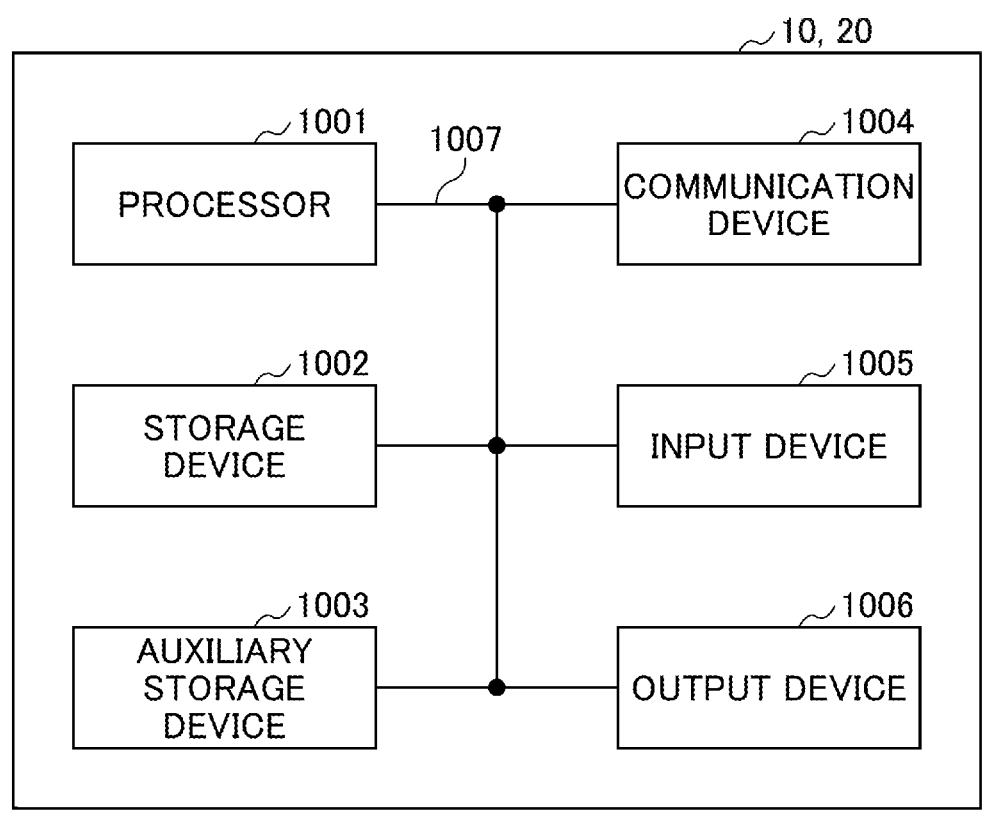
FIG. 22 is a diagram showing an example of a hardware configuration of a base station apparatus 10 or a user equipment 20 according to an embodiment of the present invention.

FIG. 21 is a diagram illustrating an example of the functional configuration of the user apparatus 20. As shown in FIG. 21, the user equipment 20 includes a transmission unit 210, a reception unit 220, a setting unit 230, and a control unit 240. The functional configuration shown in FIG. 21 is only one example. As long as the operation according to the embodiments of the present invention can be performed, the functional sections and the name of the functional unit may be any one.

The transmission unit 210 creates a transmission signal from the transmission data and wirelessly transmits the transmission signal. The receiving unit 220 receives various signals wirelessly and acquires signals from higher layers from the received signal of the physical layer.

The setting unit 230 stores various configuration information received from the base station apparatus 10 by the receiving unit 220 in the storage device and reads it from the storage device as necessary. The setting unit 230 also stores preconfigured configuration information. The controller 240 performs various controls. A function unit related to signal transmission in the control unit 240 may be included in the transmission unit 210, and a function unit related to signal reception in the control unit 240 may be included in the receiving unit 220.

<Hardware Configuration>

The block diagrams (FIGS. 20 and 21) used for explaining the above embodiment illustrate blocks in units of functions. These functional blocks (constituting units) are implemented by any combinations of at least one of hardware and software. In this regard, a method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices. The functional block may be implemented by combining software with the single device or multiple devices.

Functions include, but are not limited to, determining, calculating, processing, deriving, investigating, searching, confirming, receiving, transmitting, outputting, accessing, resolving, selecting, establishing, comparing, assuming, expecting, considering, broadcasting, notifying, communicating, forwarding, configuring, reconfiguring, allocating, mapping, assigning, and the like. For example, a functional block (constituting unit) that has a function of transmitting is referred to as a transmitting unit or a transmitter. As described above, a method for implementing these functions is not particularly limited.

For example, the base station apparatus 10, the user equipment 20, and the like according to one embodiment of the present disclosure may function as a computer that performs processing of a wireless communication according to the present disclosure. FIG. 11 is a drawing illustrating an example of a hardware configuration of the base station apparatus 10 or the user equipment 20 according to an embodiment of the present disclosure. Each of the base station apparatus 10 and user equipment 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the base station apparatus 10 and the user equipment 20 may be configured to include one or more of the devices illustrated in drawings, or may be configured not to include some of the devices.

Each function of the base station apparatus 10 and the user equipment 20 may be implemented by reading predetermined software (program) to hardware such as the processor 1001, the storage device 1002, or the like, causing the processor 1001 to perform operations, controlling communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like. For example, the control unit 140, the control unit 240, and the like described above may be realized by the processor 1001.

The processor 1001 reads a program (program code), a software module, or data from at least one of the auxiliary storage device 1003 and the communication device 1004 onto the storage device 1002, and performs various processes according to the program, the software module, or the data. As the program, a program that causes a computer to perform at least some of the operations described in the embodiment explained above is used. For example, the control unit 140 of the base station apparatus 10, as illustrated in FIG. 9, may be implemented by a control program that is stored in the storage device 1002 and that is executed by the processor 1001. Also, for example, the control unit 240 of the user equipment 20, as illustrated in FIG. 10, may be implemented by a control program that is stored in the storage device 1002 and that is executed by the processor 1001. Explanation has been provided above for the case in which the above various processing are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The auxiliary storage device 1003 may be referred to as an auxiliary storage device. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station apparatus 10 and the user equipment 20 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

SUMMARY OF EMBODIMENTS

In accordance with this embodiment, at least the base station apparatus, the user equipments and the communication method described in the following items are provided.

Item 1

A base station apparatus comprising:
  a transmission unit that transmits a first activation signal, which is an activation signal that becomes a trigger for monitoring a paging occasion, for each group of grouped user equipments and transmits a second activation signal, which is a activation signal common to multiple groups,
  wherein the transmission unit transmits, to the user equipment, information instructing whether to perform monitoring of the second activation signal or information indirectly instructing whether to perform monitoring of the second activation signal.

Item 2

The base station apparatus as described in item 1, further comprising:
  a control unit that determines whether to cause the user equipment to perform monitoring of the second activation signal based on the number of groups of the user equipments.

Item 3

A base station apparatus comprising:
  a transmission unit that transmits a first activation signal, which is an activation signal that becomes a trigger for monitoring a paging occasion, for each group of grouped user equipments and transmits a second activation signal, which is a activation signal common to multiple groups,
  wherein the transmission unit transmits a third activation signal that is an activation signal common to multiple groups using a resource different from that for transmitting the second activation signal.

Item 4

The base station apparatus as described in item 3, wherein the third activation signal is a legacy activation signal.

Item 5

A user equipment comprising:
  a reception unit that receives a group ID from a base station apparatus; and
  a control unit that determines a resource for monitoring a first activation signal that is an activation signal that becomes a trigger for monitoring a paging occasion based on the group ID,
  wherein, when the base station apparatus transmits a second activation signal that is an activation signal common to multiple groups, the reception unit determines whether to monitor the second activation signal in the resource based on information received from the base station apparatus.

Item 6

The user equipment as claimed in item 5, wherein the information received from the base station apparatus is information instructing whether to perform monitoring of the second activation signal or information indirectly instructing whether to perform monitoring of the second activation signal.

Item 7

A communication method executed by a base station apparatus comprising:
  a transmission step of transmitting a first activation signal, which is an activation signal that becomes a trigger for monitoring a paging occasion, for each group of grouped user equipments and transmitting a second activation signal, which is a activation signal common to multiple groups,
  wherein, before the transmission step, the base station apparatus transmits, to the user equipment, information instructing whether to perform monitoring of the second activation signal or information indirectly instructing whether to perform monitoring of the second activation signal.

According to the item 1 and the items 3-7, it becomes possible that the user equipment appropriately monitor an activation signal in a wireless communication network in which an activation signal applied to individual groups and an activation signal commonly applied to multiple groups are transmitted. In addition, according to the item 2, it is possible to appropriately determine whether to monitor the second activation signal.

Supplements to Embodiment

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station apparatus 10 and the user equipment 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the user equipment 20 can be performed by at least one of the base station apparatus 10 and another network node other than the base station apparatus 10 (for example, a MME, a S-GW, or the like may be mentioned, but not limited thereto). In the above, the description has been made for the case where another network node other than the base station apparatus 10 is a single node as an example. But the another network node may be a combination of a plurality of other network nodes (for example, a MME and a S-GW).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUSCH, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Thing) device such as a sensor.

In addition, a base station apparatus according to the present disclosure may be read as a user equipment. For example, each aspect or embodiment of the present disclosure may be applied to a configuration in which communication between a base station apparatus and a user equipment is replaced by communication between a plurality of user equipments 20 (that may be called D2D (Device-to-Device), V2X (Vehicle-to-Everything), or the like). In this case, a user equipment 20 may have above-described functions of the base station apparatus 10. In this regard, a word such as "up" or "down" may be read as a word corresponding to communication between terminals (for example, "side"). For example, an uplink channel, a downlink channel, or the like may be read as a side channel.

Similarly, a user equipment according to the present disclosure may be replaced with a base station apparatus. In this case, a base station apparatus may have above-described functions of the user equipment.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on Numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit configured to transmit a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user equipment 20 to assign, in TTI units, radio resources (such as frequency bandwidths, transmission power, and the like that can be used by each user equipment 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel. 8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in a RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following such article is of a plural forms.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, SS block or CSI-RS is an example of a synchronization signal or a reference signal.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

REFERENCE SIGNS LIST 10 base station apparatus
110 transmitting unit
120 receiving unit
130 setting unit
140 control unit
20 user equipment
210 transmitting unit
220 receiving unit
230 setting unit
240 control unit
1001 processor
1002 storage device
1003 auxiliary storage device
1004 communication device
1005 input device
1006 output device

The invention claimed is:

1. A base station comprising:
a processor configured to set configuration information that is related to group wake-up signals grouped for each group of terminals and that is related to a common wake-up signal common to a plurality of groups, wherein each of the common wake-up signal and the group wake-up signals is a wake-up signal transmitted to a terminal as a trigger for monitoring a paging occasion; and
a transmitter configured to transmit the configuration information to the terminal,
wherein the transmitter is configured to transmit the common wake-up signal to the terminal by using a resource for transmitting the wake-up signal,
wherein the processor assigns a legacy wake up signal to the resource of the common wake-up signal, and
wherein the processor configures the transmitter to transmit, to the terminal, the legacy wake-up signal that is a wake-up signal common to a plurality of terminals as the common wake-up signal.

2. The base station as claimed in claim 1, wherein the transmitter is configured to be able to transmit the legacy wake-up signal to the terminal by using a resource different from a resource for transmitting the common wake-up signal.

3. A terminal comprising:
a receiver configured to receive, from a base station, configuration information that is related to group wake-up signals grouped for each group of terminals and that is related to a common wake-up signal common to a plurality of groups, wherein each of the common wake-up signal and the group wake-up signals is a wake-up signal transmitted to a terminal as a trigger for monitoring a paging occasion; and
a processor configured to perform configuration on the wake-up signal based on the configuration information,
wherein the receiver is configured to receive the common wake-up signal from the base station by using a resource for transmitting the wake-up signal,
wherein the receiver is configured to receive, from the base station, a legacy wake-up signal that is a wake-up signal common to a plurality of terminals as the common wake-up signal, and
wherein the processor controls to monitor the legacy wake-up signal as the common wake-up signal, based on an assignment of the legacy wake up signal to the resource of the common wake-up signal, when monitoring the resource for transmitting the wake-up signal.

4. A communication system comprising:
a base station comprising:
a processor configured to set configuration information that is related to group wake-up signals grouped for each group of terminals and that is related to a common wake-up signal common to a plurality of groups, wherein each of the common wake-up signal and the group wake-up signals is a wake-up signal transmitted to a terminal as a trigger for monitoring a paging occasion; and
a transmitter configured to transmit the configuration information to the terminal,
wherein the transmitter is configured to transmit the common wake-up signal to the terminal by using a resource for transmitting the wake-up signal,
wherein the processor of the base station assigns a legacy wake up signal to the resource of the common wake-up signal, and
wherein the processor of the base station configures the transmitter to transmit, to the terminal, the legacy wake-up signal that is a wake-up signal common to a plurality of terminals as the common wake-up signal, and
the terminal comprising:
a receiver configured to receive the configuration information from the base station; and
a processor configured to perform configuration on the wake-up signal based on the configuration information,
wherein the receiver is configured to receive the common wake-up signal from the base station by using the resource for transmitting the wake-up signal,
wherein the receiver is configured to receive, from the base station, the legacy wake-up signal that is the wake-up signal common to the plurality of terminals as the common wake-up signal, and
wherein the processor of the terminal controls to monitor the legacy wake-up signal as the common wake-up signal, based on the assignment of the legacy wake up signal to the resource of the common wake-up signal, when monitoring the resource for transmitting the wake-up signal.

5. A communication method executed by a base station, the communication method comprising:
setting configuration information that is related to group wake-up signals grouped for each group of terminals and that is related to a common wake-up signal common to a plurality of groups, wherein each of the common wake-up signal and the group wake-up signals is a wake-up signal transmitted to a terminal as a trigger for monitoring a paging occasion;
transmitting the configuration information to the terminal, wherein, in the transmitting, the base station transmits the common wake-up signal to the terminal by using a resource for transmitting the wake-up signal;

assigning a legacy wake up signal to the resource of the common wake-up signal; and transmitting, to the terminal, the legacy wake-up signal that is a wake-up signal common to a plurality of terminals as the common wake-up signal.

* * * * *